2,786,050

PROCESS FOR THE PREPARATION OF A HEPARIN

Vittorio Capraro and Willy Logemann, Milan, and Aurelio Cantone, Como, Italy, assignors to Carlo Erba S. p. A., Milan, Italy, a firm No Drawing. Application April 8, 1955, Serial No. 500,304

Claims priority, application Italy April 20, 1954

1 Claim. (Cl. 260—211)

It is known that Heparin has an anticoagulant and clarifying activity towards plasmatic lipides. In commercial products which are extracted from natural material, such as lungs and liver, these two activities are always found associated, however, the clarifying activity of commercial Heparin is of short duration.

Hereafter a process for the separation of these two activities and the preparation of a heparin-like substance of prolonged clarifying activity will be described.

Heparin, as it is known, is a strong polybasic acid. It contains carboxylic groups, due to the D-glucuronic acid, as well as sulfuric radicals which esterify part of the hydroxylic glucidic groups. By re-acting these acid groups with bases of determinate constitution it is possible to obtain a separation into sparingly soluble salts and easier soluble salts. For this separation the derivatives of ethylendiamine, for example N,N'-di-α-methylenbenzylethylendiamine, are particularly satisfying. Heparin is precipitated only in part from these derivatives. From the mother solutions a substance of special clarifying activity and minor anticoagulant activity can be obtained by means of bases, as for example benzidine, which allow a complete precipitation of Heparin. It is possible, however, to use also all the other methods for the precipitation of Heparin from the mother solutions, as for example the precipitation with acetic acid. The process is described in the following example.

*Example*

10 g. of commercial Heparin are dissolved in 100 cc. of water and precipitated under stirring with 8 g. of N,N' - di - α - methylenbenzylethylendiamine - dihydro - chloride dissolved in 200 cc. of water. This is left to rest over night and then the precipitate which has been formed is centrifugated; the quantity varies according to the Heparin employed. To the slightly turbid filtrate are added 3 g. of benzidine dihydrochloride dissolved in 150 cc. of water. After having left this to rest the precipitate is filtered, suspended in about 100 cc. of water and the suspension is made strongly alkaline with 10% caustic soda. It is then heated for a quarter of an hour on steam bath until the solution clears. After cooling the precipitated benzidine is filtered and the filtrate is precipitated with 1300 cc. of acetic acid.

The centrifugated precipitate has a strongly decreased anticoagulant activity and, instead, an increased clarifying activity.

What we claim is:

A process for the preparation of a substance of prolonged clarifying activity upon plasmatic lipids which comprises forming salts of heparin with an N,N$^1$-di-α-alkylbenzylethylendiamine, separating said salts into a portion sparingly soluble in water and a portion readily soluble in water, precipitating the readily soluble portion with benzidine, decomposing the precipitated benzidine compound with a strong aqueous alkali, and precipitating a substance having said clarifying activity from the alkaline solution with acetic acid.

References Cited in the file of this patent

MacIntosh: "Journal Pharmacology," vol. 1, pp. 358–362, June 1949.